E. M. HEYLMAN.
CORN PLANTER.
APPLICATION FILED AUG. 29, 1908.
1,021,042.
Patented Mar. 26, 1912.
2 SHEETS—SHEET 1.
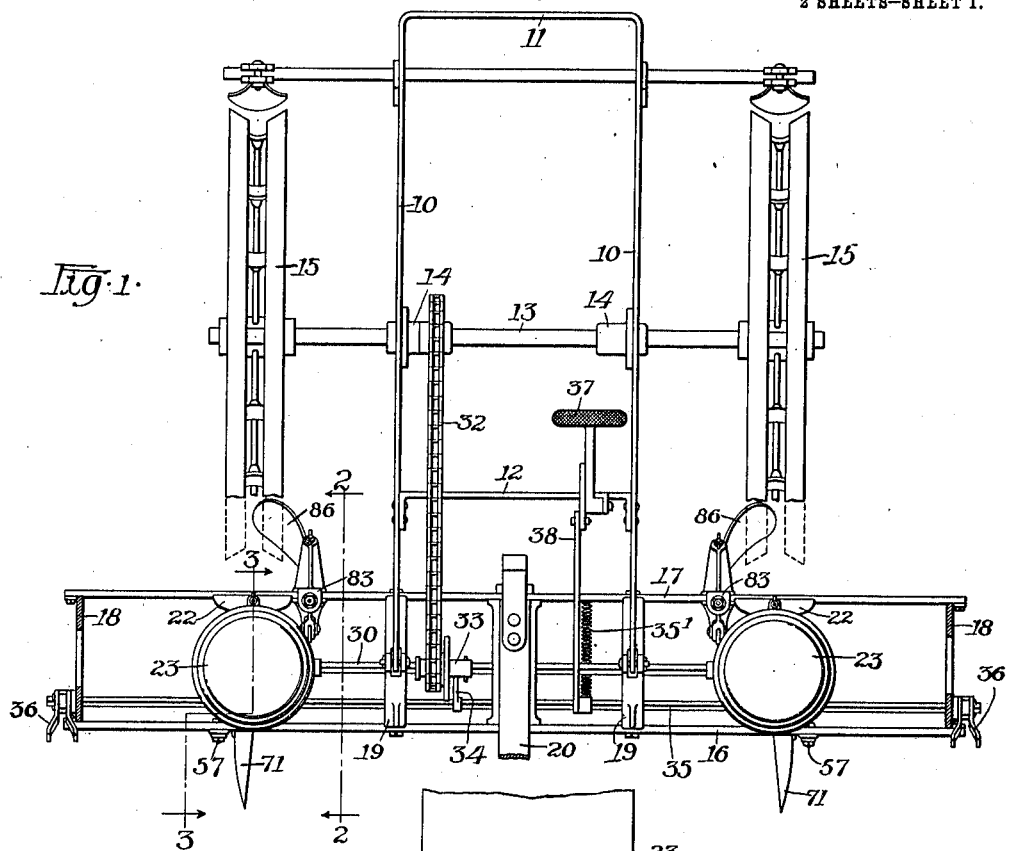
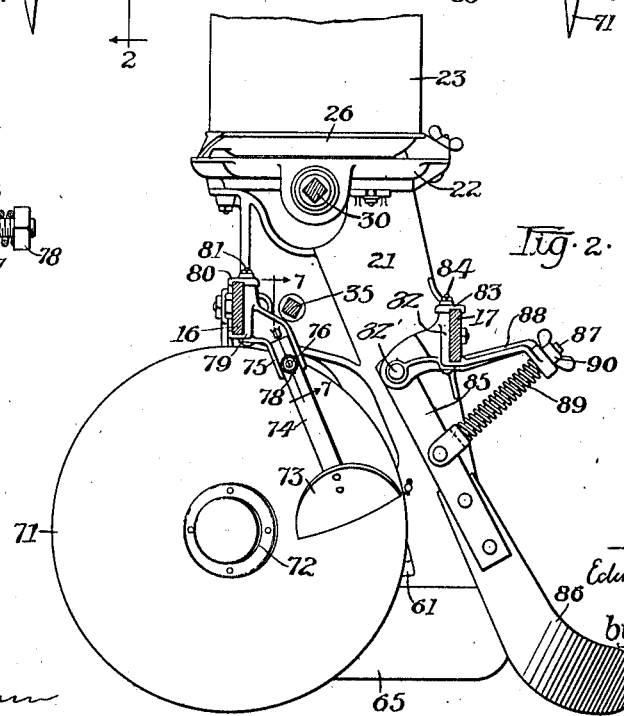
Witnesses:
J. N. Daggett.
Frank W. Benn
Inventor:
Edward M. Heylman
by Peirce & Fisher
Attys.

E. M. HEYLMAN.
CORN PLANTER.
APPLICATION FILED AUG. 29, 1908.
1,021,042.
Patented Mar. 26, 1912.
2 SHEETS—SHEET 2.
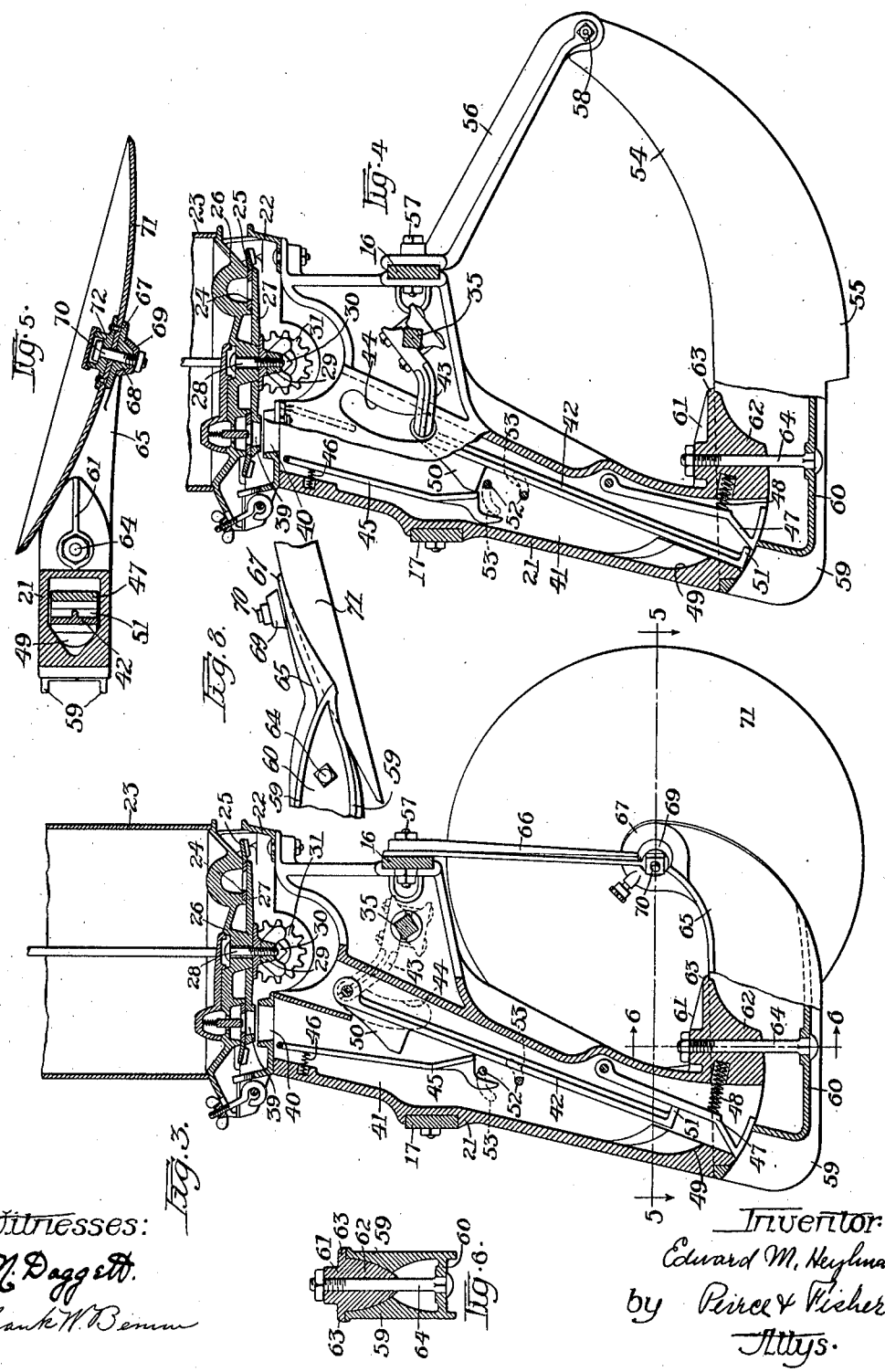

UNITED STATES PATENT OFFICE.

EDWARD M. HEYLMAN, OF JANESVILLE, WISCONSIN, ASSIGNOR TO THE JANESVILLE MACHINE COMPANY, OF JANESVILLE, WISCONSIN, A CORPORATION.

CORN-PLANTER.

1,021,042.  Specification of Letters Patent.  Patented Mar. 26, 1912.

Application filed August 29, 1908. Serial No. 450,876.

*To all whom it may concern:*

Be it known that I, EDWARD M. HEYLMAN, a citizen of the United States, and a resident of Janesville, county of Rock, State of Wisconsin, have invented certain new and useful Improvements in Corn-Planters, of which the following is a specification.

The invention relates to corn planters of the type commonly employed for check-row or drill planting and such as are provided either with shoes, or disks arranged at an angle to the line of draft, to open the furrows in front of the seed delivery mechanism, the shoes and disks being employed to suit different conditions of the soil. Such planters comprise seed cans or hoppers with suitable mechanism for delivering the seed therefrom to the delivery chute of boots arranged beneath the seed cans, the boots being provided with suitable valve mechanism for controlling the delivery of the seed therefrom into the ground. In prior constructions different forms of boots and controlling valve mechanisms have been employed with furrow opening shoes and disks.

The present invention seeks to provide a convertible disk and shoe corn planter in which means are provided for interchangeably mounting a furrow opening shoe or disk in coöperative relation with the boot so that the same planter can readily employ either form of furrow opener without changing the boots or controlling valve mechanism, or any other part of the seed delivering means.

The invention consists in the features of improvement hereinafter set forth, illustrated in the accompanying drawings and more particularly pointed out in the appended claims.

In the drawings, Figure 1 is a plan view of the improved planter. Fig. 2 is a view in elevation of the furrow forming and seeding devices with parts of the frame shown in section on the line 2—2 of Fig. 1. Fig. 3 is an enlarged detail section on the line 3—3 of Fig. 1, and showing a furrow opening disk mounted in coöperative relation with the seeding mechanism. Fig. 4 is a view similar to Fig. 3 with a furrow opening shoe substituted for the disk. Fig. 5 is a detail section on the line 5—5 of Fig. 3. Fig. 6 is a detail section on the lines 6—6 of Figs. 3 and 4. Fig. 7 is a detail section on the line 7—7 of Fig. 2. Fig. 8 is a partially inverted plan view of the parts shown in Fig. 5.

The main frame of the planter comprises side bars 10 connected by a rear bar 11 and a cross bar 12 arranged adjacent the forward ends of the side bars. An axle 13 is journaled in suitable bearings 14 upon the side bars 10 and the supporting and covering wheels 15 are fixed to the end of the axle. The seed mechanism and furrow forming devices are carried upon a front runner frame comprising front and rear bars 16 and 17 connected by end pieces 18 and intermediate cross bars 19. The side bars 10 of the main frame are pivotally connected, as usual, to the cross bars 19 of the front runner frame. A draft pole 20 is connected to the front runner frame and suitable means (not shown) are provided for raising and lowering the front frame to and from working position.

The cast metal boots 21 of the planter are carried upon the runner frame in front of the supporting and covering wheels 15 and the upper portions of these boots are arranged between and connected to the front and rear bars 16 and 17 of the front frame. The seed mechanisms employed in connection with each of the boots are alike. As shown in Fig. 3, the upper portion of the boot projects above the bars 16 and 17 and carries a cast metal support 22 for the seed can or hopper 23. Any suitable mechanism may be provided for separating and delivering the seed from the can or hopper. In the form shown, a rotatable seed plate 24 and an operating gear 25 therefor are removably mounted upon the hopper bottom 26, being held in place by a retainer plate 27 and a bolt 28 having a thumb nut 29 on its lower end. An operating shaft 30 for the seed plates is journaled at its ends in the seed can supports 22 and intermediate its ends in the cross bars 19 of the runner frame. Gears 31 upon the ends of the shaft mesh with the gears 25 that engage the seed plates 24. The shaft 30 is rotated from a sprocket on the wheel shaft 13 by means of a chain 32 which drives the loose member of a suitable clutch 33 upon the shaft 30. The clutch is thrown into and out of operation by a dog 34 upon a check-row rock shaft 35 which is journaled in suitable bearings in the upper portions of the boots 21 and provided on its ends with the usual check-row forks 36. A spring 35' yieldingly holds the check-row rock shaft 35 and parts connected thereto in normal position, and as usual, this shaft is rocked when the knots on the check-row wire engage with one of the forks 36 throwing the clutch 33 into operation to rotate the shaft 30 and also operate the seed delivering valves in the boots 21. A foot trip 37 mounted on the frame is connected to the check-row rock shaft 35 by a link 38 so that the latter may be shifted when it is desired to plant in drills rather than in check-rows.

The seed is delivered from each hopper 23 by the seed plate 24 therein through openings 39 and 40 in the retainer plate 27 and in the seed can support 22 into the seed delivering chute 41 of the boot 21. The boot and the delivering chute therein are substantially upright, but are inclined downwardly and rearwardly to a slight extent. A valve operating bar 42 extends longitudinally through the seed delivering chute 41 adjacent the front wall thereof. This bar is connected at its upper end to the end of a crank arm 43 which projects through a segmental slot 44 in the outer wall of the boot 21 adjacent the upper end thereof. The crank arm 43 is connected to the check-row shaft 35 and is normally held thereby in the position shown in Fig. 3. When the shaft is rocked the crank and valve operating bar are shifted to the position shown in Fig. 4. A valve 45 is pivoted at its upper end in the upper end of the delivering chute 41 adjacent the rear wall thereof. A spring 46 extending between the rear wall and the valve normally holds its lower end into engagement with the bar 42, as shown in Fig. 3. A valve 47 is pivotally mounted in the lower end of the delivering chute 41 at a point adjacent the front wall thereof, and a spring 48 extending between the front wall and the valve normally holds the lower end of the latter in engagement with the rear wall of the delivering chute just below a ledge or shoulder 49. At its upper end, the bar 42 is provided with a lug 50 for operating the valve 45 and, on its lower end, it is provided with a projection 51 for operating the valve 47. The seed delivered by the plate 24 through the openings 39 and 40 into the chute 41, is collected by and held in place between the lower end of the valve 45 and the rear face of the valve operating bar 42. The previously collected hill of corn rests upon the lower end of the valve 47. When the check-row rock shaft is operated the valve mechanism is shifted to the position shown in Fig. 4, the hill of corn on the valve 47 being forced by the lug 51 on the lower end of the rod 42 out of the chute into the ground. The valve 45 at the same time is shifted by the lug 50 so that the hill of corn thereon drops onto the shelf or shoulder 49 and, when the spring 35' returns the check-row shaft to normal position, the seed on the shelf or shoulder 49 drops onto the valve 47, which is returned to closed position by its spring 48.

For drilling, the valves 45 and 47 may be held in inoperative position by means of pins 52 which project through segmental slots 53 in the side walls of the delivering chute and, when shifted in the slots, are arranged to engage the lower end of the valve 45 and the operating valve 42 to hold the valve 45 and the valve 47 in inoperative position. The seed delivering and valve mechanism thus far described, may be of any usual or suitable construction.

The furrow opening shoe 54, shown in Fig. 4, is detachably connected at its rear end to the lower end of the boot 21 and extends upwardly and forwardly therefrom. A downwardly and forwardly inclined brace-bar 56 is detachably connected by a bolt 57 to the front bar 16 of the runner frame and at its forward end is connected to the forward end of the shoe by a bolt 58. The rear part of the furrow opening shoe 54 is formed of side portions 59 connected adjacent their lower edges by a transverse web 60. The boot 21 is provided, as clearly shown in Figs. 3 and 4, with a forwardly projecting toe portion 61 and with a downwardly projecting wedge-shaped part 62, having lips or flanges 63 at its upper edge. The sides 59 of the rear portion of the shoe are shaped to snugly fit upon the wedge or extension 62 upon the lower end of the boot and against the lips 63. A retainer bolt 64 extending through the web portion 60 of the shoe and through the toe and wedge portions 61 and 62 of the boot securely unite the shoe to the boot in proper relative position. The forward part of the shoe is provided with a depending edge portion 55 which is suitably shaped to open the furrow in front of the lower end of the seed delivering chute 41. The rear part of the shoe maintains the furrow clear so that the seed may be properly deposited therein by the valve mechanism.

By removing the bolts 64 and 57, however, the shoe 54 and bar 56 can be readily disconnected from the planter and a disk support 65 and a brace-bar 66 can be substituted therefor. The rear end of the disk support 65 is preferably entirely similar in construction to the rear end of the furrow opening shoe 54 and it is detachably connected to the lower end of the boot 21 in the same manner by the bolt 64. The disk support is, however, considerably shorter than the shoe 54 and it is not provided with a depending furrow forming edge portion. The disk support 65, like the shoe 54, is detachably connected at its rear end to the lower end of the boot 21. The forward end of the disk support is upturned and provided with a circular portion 67 having a central conical boss 68 which fits within a correspondingly shaped socket 69 in the lower end of the brace-bar 66. A bolt 70, whereon the disk 71 is rotatably mounted, extends through the parts 68 and 69 of the disk support and brace-bar and through a hub portion 72 that is riveted to the disk. The furrow opening disk 71 is of concavo-convex form and the hub portion 72 is secured to the concave side thereof, while the convex side is arranged against the forward portion of the disk support 65. This forward part of the disk support, including the circular portion 67, is inclined at an angle to the line of draft, so that, as clearly shown in Figs. 1 and 5, the furrow opening disks are similarly inclined with their concave faces turned slightly toward the front and in position to properly and effectively form the furrows in which the seed is to be planted. The forward portion of the disk support 65 is suitably shaped to conform with the convex side of the disk (see Fig. 8), which is turned slightly in a rearward direction, so that the furrow formed by the disk is kept clear by the disk support until the seed is deposited therein. In this way the part 65 not only acts as a support for the rotatable furrow opening disk, but also acts as a shield or shoe therefor to prevent the furrow formed by the disk from filling up until after the seed has been deposited therein. The forward edge of the disk support 65 also acts as a scraper for the convex side of the disk.

A scraper 73 for the concave side of the disk is fixed to the lower end of a short arm 74. The upper end of this arm is arranged within a seat formed in the lower portion of a clamp member 75. A bolt 76 extends through the clamp member and a spring 77 coiled around the bolt extends between a nut 78 on the end of the bolt and the scraper supporting arm 74. A portion 79 of the clamp member 75 is shaped to engage the lower edge of the front bar 16 of the runner frame. A coöperating clamp member 80 is arranged to engage the upper edge of this bar and a bolt 81 extending through the clamp members firmly connects them to the bar and holds the scraper 73 in position to engage the concave side of the furrow opening disk in the rear of the center thereof. The spring 77 yieldingly holds the scraper into engagement with the disk.

A clamp comprising members 82 and 83 is similarly connected to the rear bar 17 of the runner frame by a bolt 84. The clamp member 82 is provided with a forwardly projecting lug 82' to which the upper end of an arm 85 is pivotally connected. A curved covering blade 86 is connected, as shown, to the lower end of the arm 85. The forked end of a bolt 87 is pivoted to the lower portion of the arm 85 and extends rearwardly therefrom through an opening in the end of a rearwardly projecting arm 88, which is formed upon the clamp member 82. A spring 89 is coiled about the bolt 87 and extends between the arm 88 and the forked end of the bolt and a thumb nut 90 is adjustably threaded upon the outer end of the bolt. In this way, the covering blades 86 are yieldingly held in position to turn the earth back into the furrows formed by the disks 71 after the seed has been deposited therein. It is obvious that by loosening the clamp bolts 81 and 84, the disk scrapers 73 and covering blades may be readily removed and that by removing the bolts 64 and 57 the disk supports 65, brace-bars 66 and furrow opening disks 71 may be readily removed so that the furrow opening shoes 54 and brace-bars 56 therefor may be substituted.

The invention thus provides simple and effective means by which the corn planter may be readily and conveniently provided either with furrow opening shoes or furrow opening disks, in accordance with the varying conditions of the soil, and that the change can be made without in any way changing or interfering with the seed delivery chute or valve mechanism therein.

It is obvious that numerous changes can be made in the details set forth without departure from the essentials of the invention.

I claim as my invention:—

1. A corn-planter having a boot provided with a seed delivery chute, a combined disk support and shield detachably secured to said boot and a rotatable, concavo-convex, furrow opening disk mounted at an incline to the line of draft upon said combined support and shield with its convex side engaging the same.

2. In a corn planter, the combination with a boot having a seed delivery chute, of a rotatable, concavo-convex, furrow opening disk and a combined disk support and shield detachably connected at its rear end to the lower end of said boot, said disk being mounted in inclined position upon the forward end of said combined support and shield with the convex side engaging the same.

3. In a corn-planter, the combination with a boot having a seed delivery chute, of a disk support detachably connected at its rear end to the lower end of said boot and having an upturned forward end, a furrow opening disk rotatably mounted at an incline to the line of draft upon the forward end of said support with the convex side engaging the same and a brace bar connected to the forward end of said support.

4. In a corn-planter, the combination with a boot having a delivery chute, of a combined disk support and shield detachably connected at its rear end to the lower end of said boot and a concavo-convex furrow opening disk rotatably mounted in inclined position at an angle to the line of draft upon the forward end of said combined support and shield with the convex side against the same.

5. In a corn-planter the combination with a runner frame, a boot having a seed delivery chute mounted on said frame, of a combined disk support and shield detachably connected at its rear end to the lower end of said boot and having an upturned forward end, a brace bar connecting the forward end of said disk support and shield to said frame, and a concavo-convex furrow opening disk rotatably mounted upon the forward end of said support and shield with its convex side against the same.

6. In a corn planter, the combination with a boot having a seed delivery chute, of a combined disk support and shield detachably mounted on the lower end of said boot for guarding the delivery end of said chute and having a portion projecting forwardly from said boot, and a single, concavo-convex furrow opening disk rotatably mounted at an angle to the line of draft upon the forward portion of said supporting shield, said supporting shield being arranged on the convex side of said disk and wholly within the angle thereof.

7. In a corn planter, the combination with the runner frame, and a boot secured to said frame having a seed delivery chute, of a ground engaging shoe detachably connected to the lower end of said boot and projecting forwardly therefrom, and a single, concavo-convex furrow opening disk mounted at an angle to the line of draft upon the forward end of said shoe with its convex face engaging the same.

8. In a corn planter, the combination with the frame and a boot secured to the frame and having a seed delivery chute, of a ground engaging shoe detachably connected to the lower end of said boot and projecting forwardly therefrom, said shoe being arranged to guard the delivery end of said chute, and a single, concavo-convex furrow opening disk mounted at an angle to the line of draft upon the forward end of said shoe, said shoe being arranged on the convex side of said disk and wholly within the angle thereof.

9. In a corn-planter, the combination with the runner frame comprising connected front and rear bars, a boot having a seed delivery chute secured to said frame, of a combined disk support and shield detachably connected at its rear end to the lower end of said boot, a brace bar connected to the front bar of the runner frame and the forward end of said disk support and shield, a furrow opening disk rotatably mounted at an incline to the line of draft upon the forward end of said combined disk support and shield with its convex side against the same, clamps detachably secured to the front and rear bars of said runner frame and a disk-scraper and a covering blade carried by said clamps.

10. In a corn-planter, the combination with the runner frame, of a boot mounted on said frame having a seed delivery chute, a combined disk support and shield detachably connected at its rear end to the lower end of said boot and having an upturned forward end, a brace bar connecting the forward end of said supporting shield to said runner frame and a rotatable, concavo-convex furrow opening disk mounted at an angle to the line of draft upon the forward end of said supporting shield with its convex side against the same.

11. In a planter, the combination with the runner frame, of a boot mounted on said frame having a seed delivery chute, a ground engaging shoe detachably mounted at its rear end to the lower end of said boot for guarding the delivery end of said chute and having an upturned forward end portion inclined to the line of draft and a rotatable furrow opening disk mounted upon the inclined forward portion of said shoe and held in inclined position thereby with its convex side engaging said shoe.

12. In a corn planter, the combination with the frame and a boot mounted thereon having a seed delivery chute, of a combined disk support and shield detachably connected at its rear end to the lower end of said boot and projecting forwardly and upwardly therefrom, a brace bar extending between said frame and the forward end of said disk support and shield, a single, concavo-convex furrow opening disk rotatably mounted at an incline to the line of draft upon the forward end of said disk support and shield and a fastener bolt extending through said disk and through the overlapping ends of said brace bar and said supporting shield.

EDWARD M. HEYLMAN.

Witnesses:
J. A. Craig,
W. F. Bosworth.

Copies of this patent may be obtained for five cents each, by addressing the "Commissioner of Patents, Washington, D. C."